United States Patent

[11] 3,596,623

| [72] | Inventor | Ernst G. Frankel |
| | | Los Angeles, Calif. |
| [21] | Appl. No. | 642,512 |
| [22] | Filed | May 31, 1967 |
| [45] | Patented | Aug. 3, 1971 |
| [73] | Assignee | Litton Systems, Inc. |
| | | Beverly Hills, Calif. |

[54] DOUBLE-HINGED FLOTATION RAMP
11 Claims, 7 Drawing Figs.

[52] U.S. Cl. ....................................................... 114/43.5
[51] Int. Cl. ........................................................ B63b 35/44
[50] Field of Search ............................................ 114/43.5,
60, 70, 235; 214/12

[56] References Cited
UNITED STATES PATENTS

| 1,773,999 | 8/1930 | Haight............................. | 114/43.5 |
| Re. 20,551 | 11/1937 | Rouse.............................. | 114/43.5 |
| 2,694,996 | 11/1954 | Poche............................. | 114/43.5 X |

*Primary Examiner*—Trygve M. Blix
*Attorneys*—Walter R. Thiel, Alan C. Rose and Alfred B. Levine ABSTRACT: An apparatus for coupling a small floating object such as a ship to another larger object or ship where the component of motion in the vertical direction of the portion of the apparatus contacted by the small ship is maintained substantially synchronous with the component of motion in the vertical direction of the small ship.

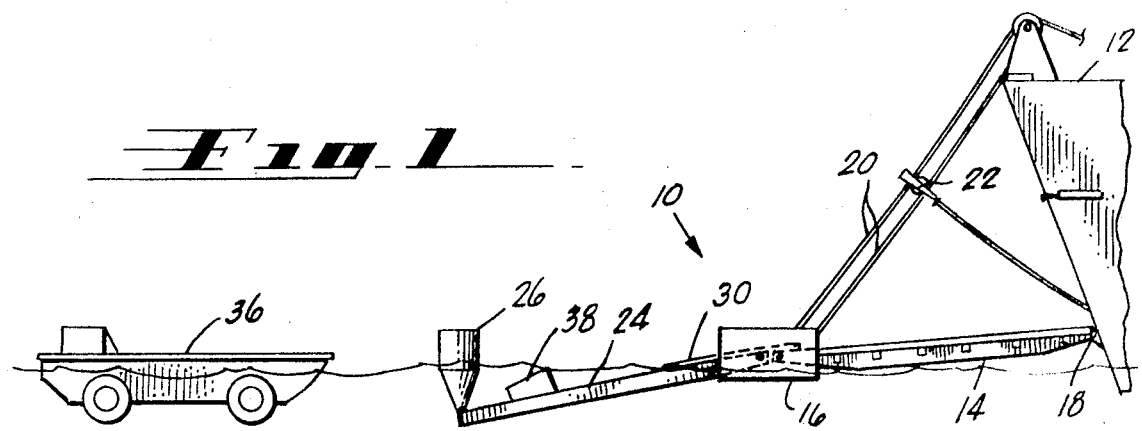
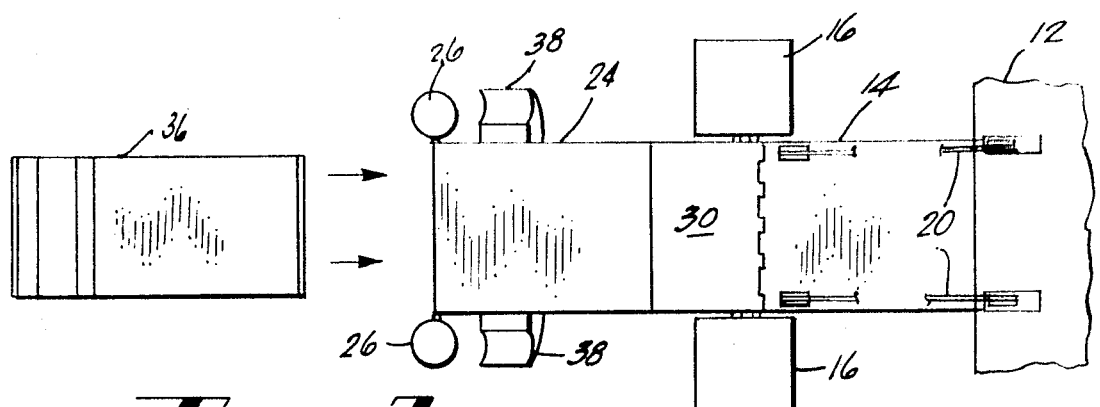
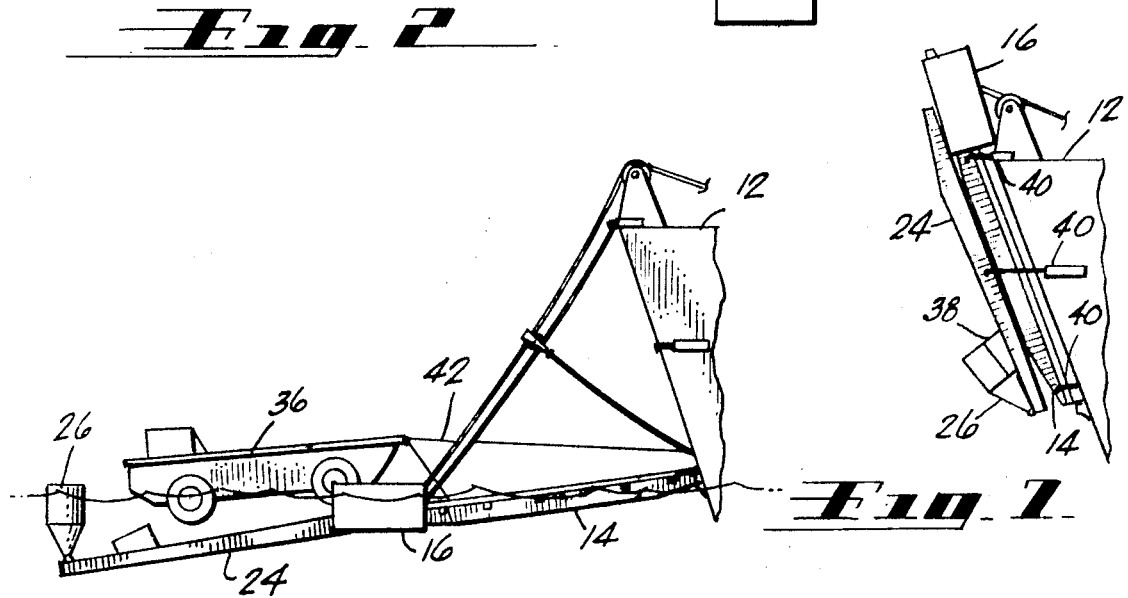

INVENTOR
ERNST G. FRANKEL
BY
Walter R. Thiel
ATTORNEY

DOUBLE-HINGED FLOTATION RAMP

This is a ramp for an object such as a ship floating in a moving fluid, and more particularly, a ramp for coupling one ship to another ship which includes a double-hinged flotation platform designed to move in synchronism with one of the ships.

As long as man has navigated the water masses of the earth, he has sought improved methods of shipboard discharge and receipt of cargo, personnel or amphibious ships. Among the many factors affecting such transfer of cargo, personnel or amphibious ships is the motion imparted to the ship because of waves in the water. Typically, waves of varying length and frequency are present simultaneously in moving water. However not all waves significantly affect an object floating in the water for it has been found that a ship is affected most by those waves of a length substantially equal to the longitudinal dimension of the ship. Therefore a small ship attempting to move close to a larger ship for the purpose of transferring cargo or personnel or for loading the smaller ship aboard the larger ship is affected by waves of different amplitude and frequency than those affecting the larger ship and if the waves are of significant magnitude, substantial and often damaging impact force results when the two ships are brought into contact or into contact with a ramp for coupling them together.

Various forms of ramp apparatus have been used to couple a smaller ship to a larger ship so that cargo and personnel can be transferred or the smaller ship can be brought aboard the larger ship. Heretofore such ramp apparatus have comprised either a fixed ramp with both ends secured to one of the ships or a ramp having one end supported by floats and the other end secured to one of the ships. While the use of both of these ramps have proven satisfactory in relatively calm water, neither of them can be used in water having waves of substantial magnitude such as those of sea states greater than 3 because impact forces present when the smaller ship attempts to engage the ramp make such engagement virtually impossible.

It has been recognized that the detrimental consequences of such impact forces could be avoided, and a ship could beach smoothly with a floating dock or other similar apparatus, such as a loading ramp, provided that such apparatus is decoupled from the ship. This means to say that the loading ramp must be free-floating, i.e., free to move vertically with the waves or under their impact, independently from the structure to which it is attached, particularly when the marine structure is either a large vessel or a stationary dock. In the present invention, this free-floating condition is accomplished by using two ramp structures which are interconnected by a hinge mechanism, with one end of one of the ramp structures being connectable, also by a hinge mechanism, to the marine structure which is a stationary dock or a large vessel. It can be seen that with such double-hinged ramp structure the ramp structure not coupled to the marine structure can be maintained free-floating by buoyancy means of conventional nature.

In order to further explain the concepts involved in this invention, it will be remembered that a free-floating object, sustained at the surface of a body of water by buoyancy forces, constitutes a system which is free to perform oscillating motions, upon the application of impact forces of short duration, in similarity with a spring-loaded system. Such system of a free-floating object has, therefore, its own natural frequency of oscillation which is a function of design parameters, as is well known in the art. Moreover, it will also be remembered that the conventional meaning of the word "tuning" is that of adjusting the natural frequency of a system to a specific, desired frequency.

One of the basic concepts of the present invention is thought to reside in the provision of a tuning mechanism for a free-floating ramp structure. As this terminology will be used in the following description of the invention, it will now become apparent that, in accordance with one of the principles of the present invention, tuning means for the free-floating ramp structure are provided to adjust its natural frequency to the natural frequency of oscillation of a barge or ship which, in use, approaches and finally beaches against the ramp structure.

Since both the ramp and the approaching barge or lighter are excited by the impact of waves into oscillation, i.e., to move up and down, at their natural frequency and, furthermore, since these two natural frequencies are made identical in accordance with this invention, the achieved tuning effect results in a synchronization of the up and down motion of the ramp and lighter, permitting approach, contact, and loading and unloading operations at much higher sea states than was heretofore possible.

Therefore an object of this invention is to provide an improved apparatus for coupling objects floating in a fluid.

Another object of this invention is to provide an improved ramp for coupling a smaller ship to a larger ship so that the vertical movement of a portion of the ramp is substantially synchronous with the vertical movement of the smaller ship.

A further object of this invention is to provide an improved ramp for coupling a smaller ship to a larger ship which includes a simple ramp affixed to the larger ship and a flotation platform decoupled from the vertical movement of the larger ship and constructed to move substantially in synchronism with the vertical movement of the smaller ship.

A still further object of this invention is to provide an apparatus for coupling two ships wherein the apparatus forms part of the shell of one of the ships when it is not in use.

The above numerated objects are accomplished according to a preferred embodiment of this invention in an apparatus including a beaching or ramp structure affixed to an object including a flotation platform member which is decoupled from the vertical movement of the object, if any, and a tuning device to develop a synchronous relationship between the component of motion in the vertical direction of the platform member and that of a second object or ship which beaches against the platform member. In an adaptation of this embodiment the apparatus functions as a portion of the shell of one of the ships when not in use.

Other advantages of the invention will hereinafter become more fully apparent from the following detailed description of the drawings which illustrate a preferred embodiment thereof, and in which:

FIG. 1 is a side elevational view of the improved apparatus of the present invention showing a portion of a large ship to which the apparatus is pivotally affixed and a typical small amphibious ship approaching the apparatus.

FIG. 2 is a plan view of the apparatus portion of the large ship and small ship shown in FIG. 1.

FIG. 3 is a side elevational view of a portion of a large ship, the improved apparatus of the present invention, and a small ship beached in engagement with the apparatus illustrating the transfer of objects between the large ship and the small ship.

FIG. 7 is a side elevational view of a portion of the large ship and the improved apparatus of the present invention shown in retracted or stored position and forming part of the shell of the ship.

Figure 4:
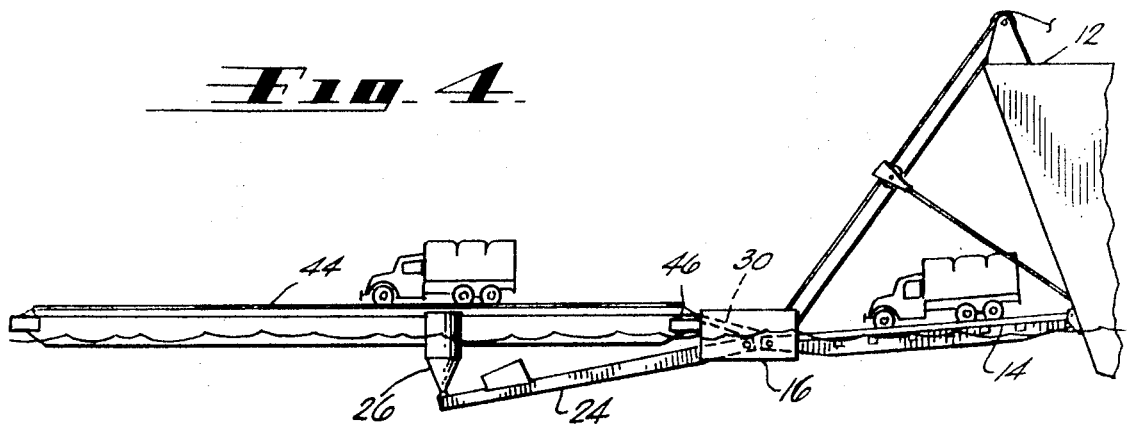
FIG. 4 is like FIG. 3, however in this Figure the small ship is shown as a barge.

Referring first to FIGS. 1 and 2 the principles of the present invention are shown in one embodiment of the apparatus which is illustrated as pivotally affixed to the stern section of a ship 12. The apparatus includes a basic or simple partially floatable ramp portion 14 which has one end pivotally secured to the ship 12 and its other end pivotally supported by a pair of forward floating chambers or pontoons 16. For illustration the simple ramp 14 is shown secured to the stern of the ship 12 in a conventional fashion such as by flanges and pins as shown at 18 and may include a plurality of cables 20 and associated idlers 22 which function to raise and lower the ramp 14. While cables and attachments are shown, hydraulic, activated, pneumatic, or electromagnetic devices for raising and lowering the ramp 14 can also be used without varying from the scope of the invention. Adjacent to the aft end of the basic ramp 14 is a flotation platform member 24 which is pivotally supported at its forward end by the pair of forward flotation chambers 16 and at its aft end is pivotally supported by a pair of aft flotation chambers 26. Thus the platform member 24 is floatably supported by the four flotation chambers and is free to pivot about its end.

While the platform 24 and basic ramp 14 have been shown as pivoting separately about the forward flotation chambers 16, it should be understood that the platform 24 could be pivotally secured to the end of the basic ramp 14 and this assemblage pivotally secured to the chamber 16. Typically the basic ramp 14 and the platform 24 are of conventional construction such as a plurality of structural steel elements typically longitudinal girders covered by a grating or flanges covered with a stiffened top deck and are of such configuration that equipment and personnel may easily move over them.

The pivotal support of the platform 24 by the pairs of forward and aft chambers effectively and substantially decouples the platform from the ship 12. Thus vertical movements of the stern of the ship will not be transmitted to the platform 24 as a vertical motion. Such motions merely cause the platform 24 to pivot about the forward chambers 16.

The aft end of the platform 24 is submerged a greater distance below the surface of the water to permit an amphibious ship or lighter 36 such as that shown in FIGS. 1 and 2 to beach against the platform 24. This depth of submergence is achieved through varying the buoyancy of the aft chambers 26 and, as will be discussed later, can be varied to permit ships or lighters of varying drafts to beach against the platform 24. On either side of the platform 24 near the aft end is a saddle or cradle 38 for stowing the aft chambers 26 when the apparatus is retracted into an engagement with the stern of the ship 12.

Figure 5:
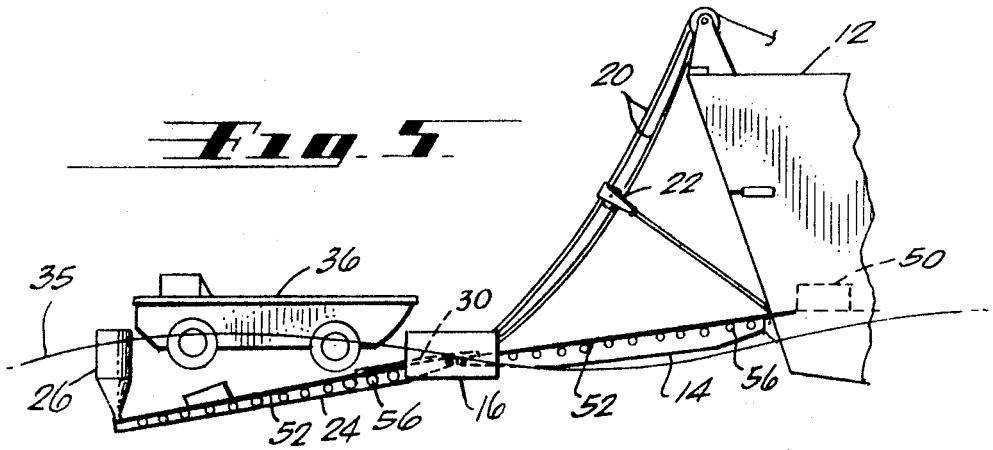
FIG. 5 is a side elevational drawing of a small amphibious ship engaging the apparatus of the present invention illustrating the synchronized in phase movement established between the small ship and the flotation platform of the apparatus.

To synchronize or tune the vertical movement of the platform 24 with the vertical movement of the ship or lighter 36 resulting from the influence of waves on both objects, the size of the forward and aft chambers 16, 26 respectively have been selected so that the surface piercing area or area at the waterline and the displacement of the chambers are substantially equal to the area surface piercing and displacement of the ship or lighter 36. This is shown in FIG. 2. Thus, as shown in FIG. 5 where a sea state of significant magnitude is illustrated by a wave 35 when the ship 36 has maneuvered into position over the platform 24, the vertical motion of the ship 36 and the platform 24 are closely synchronized and even in rough seas contact force will be extremely low because the differential vertical movements between the platform 24 and the ship 36 are minimal.

Referring now to FIGS. 3 and 4, there is shown in FIG. 3 an amphibious ship or lighter 36 beached in engagement with the platform 24 and, if necessary, secured by lines 42. In FIG. 4 there is shown a barge 44 in position to receive cargo from the ship. When a barge is used as the lighter, it has been found desirable to use a pair of bumpers 46 on either side of the barge 44 to engage the forward chambers 16 and an enlarged secondary ramp 30. The secondary ramp 30 facilitates the transition from the ramp 14 to the barge 44 and is hinged to the aft end of the ramp 14 and engages the upper surface of the barge 44. Even though the barge 44 is wider than platform 24 it may still be beached because the aft chambers 26 are hinged and will swing out laterally to permit the barge to move in over the platform. When a self-powered lighter is used it is desirable to continue powering the lighter during the loading or unloading operation to maintain it in position. However if a lighter is used which is not self-powered, it may be secured to the ship by a plurality of lines or, if desired, supported directly by the platform 24 through varying the buoyancy of the forward and aft chambers. In FIG. 5 there is shown schematically a system for varying the buoyancy of the forward and aft chambers 16, 26. Such a system would be conventional in nature and typically would include a pneumatic supply system 50 positioned on the large ship and coupled to the chamber with suitable lines and valves 52. In addition each of the chambers 16, 26 would comprise at least two sections, one coupled to the pneumatic system 50 for varying the buoyancy of the chamber and the other a sealed chamber or dome section to prevent the chambers 16, 26 from sinking. Also in FIG. 5 is shown schematically a possible conveyor device 56, incorporated into the upper surface of the basic ramp 14 and platform 24. This type of device would be driven by a conventional drive system (not shown) such as a belt or chain drive and would be used to automatically move cargo or the small ship into the larger ship.

Figure 6:
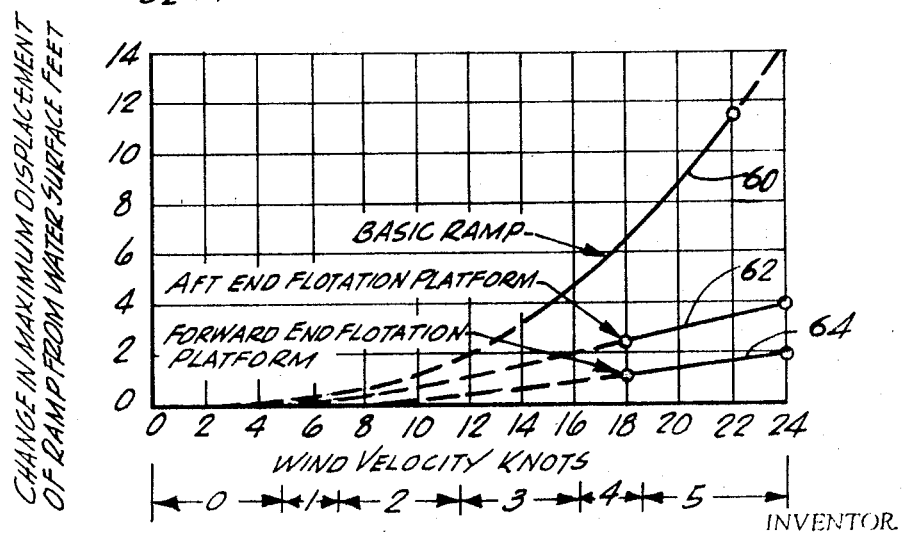
FIG. 6 is a graph showing the displacement of the ends of the flotation platform and the end of the basic ramp for various sea states.

To illustrate the substantial reduction in displacement of the ends of the platform through the tuning or synchronization of the vertical motion of the platform to that of the lighter, the graph of FIG. 6 depicts for various wind velocities and sea states in an upper line 60 the displacement of the aft end of the basic ramp, in a middle line 62 the displacement of the aft end of the platform, and in a low line 64 the displacement of the forward end of the platform. Thus it is easily seen that for sea state 5, for example, the basic ramp will experience a change in displacement with respect to the water surface by as much as 6—7 feet while under the same conditions the change at the forward and aft end of flotation platform are only in the order of 1 foot. This greatly reduced displacement is achieved through the matching of the displacement and the water plane area of the platform 24 with that of the lighter to couple these to the motion of the waves' surface and the decoupling of the platform from the vertical motion of the ship.

In FIG. 7 there is shown one method of stowing this novel ramp apparatus in engagement with one object such as the stern of the ship 12. In this embodiment the basic ramp 14 actually forms part of the shell portion of the structure of the ship once the apparatus is stowed and the platform 24 and chambers 16, 26 are rigidly latched in engagement with the basic ramp. This resulting stowing of the apparatus is easily achieved by conventional latching hook and cable mechanisms shown generally at 40 because the basic ramp 14 pivots about the stern of the ship at the point of attachment 18 and the platform 24 pivots about the end of the basic ramp or the forward chambers 16. While the ramp apparatus has been shown attached to the stern of a ship 12 it should be understood that similar attachments may be made to other fixed or floating objects without varying from the scope of the invention.

While but one embodiment and an adaptation of this embodiment have been illustrated, it will be apparent to those skilled in the art that variation in the disclosed arrangement, both as to its details and as to the organization of such details, may be made without departing from the spirit and scope hereof. Accordingly, it is intended that the foregoing disclosure and the showings made in the drawings shall be construed only as illustrative of the principles of this invention and not construed in a limiting sense.

I claim as my invention:

1. In combination with first and second objects in an undulating fluid, an apparatus for coupling said objects comprising:
   beaching means including a partially floating ramp pivotally affixed at one end to said first object and at the other end to a pair of forward flotation chambers floating in said fluid and a totally floating platform pivotally affixed at one end to said pair of forward flotation chambers and at the other end to a pair of aft flotation chambers whereby said platform moves vertically with said undulations substantially independent of the motion of said first object and said partially floating ramp; and
   tuning means included in said beaching means for tuning the vertical motion of said platform to be substantially synchronous with the vertical motion of the second object.

2. The apparatus of claim 1 wherein the tuning means is the forward and aft flotation chambers having a total displacement and surface piercing area substantially equals the displacement and surface piercing area of said second ship.

3. The apparatus of claim 1 wherein the partially floating ramp is affixed to the pair of forward flotation chambers intermediate its forward and aft ends and the forward end of the platform member is pivotally affixed to the aft end of the partially floating ramp.

4. The apparatus of claim 2 including means cooperating with said forward and aft flotation chambers to vary the displacement thereof to tune the movement of the platform member to maintain an in phase relationship between its vertical motion and that of the said second ship.

5. The apparatus of claim 1 wherein the beaching means includes conveying means to convey one of said ships toward the other ship once it engages said beaching means.

6. The apparatus of claim 1 wherein the second ship is a barge and the apparatus includes a secondary ramp hinged to the aft end of the partially floating ramp and pivotable into engagement with one surface of the barge when it is beached against said platform member.

7. In combination with a first ship in a moving fluid an apparatus adapted to be engaged by a second ship comprising:

beaching means adapted to form a portion of the shell of said ship in a first position and to form a ramp engageable by said second ship in a second position, said beaching means including a platform member floatable in said fluid when said means are in said second position;

tuning means included in said beaching means for tuning the vertical motion of said platform member to be substantially synchronous with the vertical motion of the second ship and driving means in said first ship and cooperating with said beaching means for moving said beaching means between said first and second positions.

8. The apparatus of claim 7 wherein the beaching means includes a ramp pivotally affixed at one end to said first ship and at the other end to a pair of forward flotation chambers floating in said fluid, and said platform member is a totally floating platform pivotally affixed at one end to said forward flotation chambers and at the other end to a pair of aft flotation chambers whereby said platform moves vertically with said waves substantially independently of the vertical motion of said one ship and said partially floating ramp.

9. The apparatus of claim 7 wherein the tuning means is the forward and aft flotation chambers having a total displacement and surface piercing area substantially equal to the displacement and surface piercing area of said second ship.

10. The apparatus of claim 7 wherein the partially floating ramp is affixed to the pair of forward flotation chambers intermediate its forward and aft ends and the forward end of the platform member is pivotally affixed to the aft end of the partially floating ramp.

11. The apparatus of claim 9 including means cooperating with said forward and aft flotation chambers to vary the displacement thereof to tune the vertical movement of the platform member to maintain an in phase relationship between its vertical motion and that of the said other ship.